(12) United States Patent
Nicolaes

(10) Patent No.: US 11,341,639 B2
(45) Date of Patent: May 24, 2022

(54) THREE-DIMENSIONAL MEDICAL IMAGE ANALYSIS METHOD AND SYSTEM FOR IDENTIFICATION OF VERTEBRAL FRACTURES

(71) Applicant: UCB Biopharma SRL, Brussels (BE)

(72) Inventor: Joeri Nicolaes, Brussels (BE)

(73) Assignee: UCB BIOPHARMA SRL, Brussels (BE)

( * ) Notice: Subject to any disclaimer, the term of this patent is extended or adjusted under 35 U.S.C. 154(b) by 0 days.

(21) Appl. No.: 16/767,785

(22) PCT Filed: Nov. 29, 2018

(86) PCT No.: PCT/EP2018/082925
§ 371 (c)(1),
(2) Date: May 28, 2020

(87) PCT Pub. No.: WO2019/106061
PCT Pub. Date: Jun. 6, 2019

(65) Prior Publication Data
US 2020/0364856 A1 Nov. 19, 2020

(30) Foreign Application Priority Data

Dec. 1, 2017 (GB) .................................. 1720059

(51) Int. Cl.
*G06K 9/00* (2022.01)
*G06T 7/00* (2017.01)
(Continued)

(52) U.S. Cl.
CPC .......... *G06T 7/0012* (2013.01); *G06K 9/6277* (2013.01); *G06T 7/11* (2017.01);
(Continued)

(58) Field of Classification Search
CPC ......... G06T 7/0012; G06T 7/11; G06T 15/08; G06T 2207/20081; G06T 2207/20084;
(Continued)

(56) References Cited

U.S. PATENT DOCUMENTS 8,175,349 B2 5/2012 Jerebko et al.
8,437,521 B2 5/2013 Lu et al.
(Continued)

FOREIGN PATENT DOCUMENTS

WO WO2016013004 A1 1/2016
WO WO2016013005 A2 1/2016

OTHER PUBLICATIONS

Roth Holger R et al: "Deep convolutional networks for automated detection of posterior-element fractures on spine CT," Progress in Biomedical Optics and Imaging, SPIE—International Society for Optical Engineering, Bellingham, WA, US, vol. 9785, Mar. 24, 2016 (Mar. 24, 2016), pp. 97850P-97850P (Year: 2016).*
(Continued)

*Primary Examiner* — Van D Huynh
(74) *Attorney, Agent, or Firm* — Davidson, Davidson & Kappel, LLC

(57) ABSTRACT

A machine-based learning method estimates a probability of bone fractures in a 3D image, more specifically vertebral fractures. The method and system utilizing such method utilize a data-driven computational model to learn 3D image features for classifying vertebra fractures. A three-dimensional medical image analysis system for predicting a presence of a vertebral fracture in a subject includes a 3D image processor for receiving and processing 3D image data of a 3D image of the subject, producing two or more sets of 3D voxels. Each of the sets of 3D voxels corresponds to an entirety of the 3D image and each of the sets of 3D voxels consists of equal 3D voxels of different dimensions. The
(Continued)

system also includes a voxel classifier for assigning the 3D voxels one or more class probabilities each of the 3D voxels contains a fracture using a computational model, and a fracture probability estimator for estimating a probability of the presence of a vertebral fracture in the subject.

39 Claims, 14 Drawing Sheets

(51) Int. Cl.
    *G06T 7/11*     (2017.01)
    *G06K 9/62*     (2022.01)
    *G06T 15/08*     (2011.01)

(52) U.S. Cl.
    CPC .... *G06T 15/08* (2013.01); *G06T 2207/20081* (2013.01); *G06T 2207/20084* (2013.01); *G06T 2207/30012* (2013.01)

(58) Field of Classification Search
    CPC ........... G06T 2207/30012; G06T 2207/10081; G06K 9/6277; A61B 6/5217; A61B 6/505; A61B 6/032; A61B 2576/00; G16H 50/20; G16H 30/40
    USPC .......................................................... 382/128
    See application file for complete search history.

(56) References Cited

U.S. PATENT DOCUMENTS

| | | | | |
|---|---|---|---|---|
| 2002/0191823 | A1* | 12/2002 | Wehrli ....................... | G06T 7/62 382/128 |
| 2008/0216845 | A1* | 9/2008 | De Bruijne ............ | A61B 6/505 128/898 |
| 2009/0169087 | A1* | 7/2009 | Doi ........................... | G06T 7/12 382/132 |
| 2011/0142307 | A1* | 6/2011 | Ghosh ....................... | G06T 7/41 382/128 |
| 2013/0077840 | A1 | 3/2013 | Blumfield et al. | |

OTHER PUBLICATIONS

Darko Tern et al: "Parametric modelling and segmentation of vertebral bodies in 3D CT and MR spine images", Physics in Medicine and Biology, Institute of Physics Publishing, Bristol GB, vol. 56, No. 23, Nov. 11, 2011 (Nov. 11, 2011), pp. 7505-7522 (Year: 2011).*

Klinder et al., "Automated Model-Based Vertebra Detection, Identification, and Segmentation in CT Images", Medical Image Analysis 13, pp. 471-482 (2009) (accessible at http://www.sciencedirect.eom/science/journal/13618415).

Klinder et al., "Spine Segmentation Using Articulated Shape Models", Institut fur Informationsverarbeitung, Leibniz University of Hanover, Germany, Philips Research Europe-Hamburg, Sector Medical Imaging Systems, Germany, D. Metaxas et al. (Eds): MICCAI, Part I, LNCS 5241 pp. 227-234 (2008).

Ghosh et al., "Automatic Lumbar Vertebra Segmentation from Clinical CT for Wedge Compression Fracture Diagnosis", University at Buffalo, SUNY, Buffalo, NY 14260, Proscan Imaging of Buffalo, Williamsville, NY 14221, pp. 1-9 (2011).

Yao et al., "Quantitative Vertebral Compression Fracture Evaluation Using a Height Compass", Medical Imaging 2012: Computer Aided Diagnosis, Proc of SPIE vol. 8315, 83151X 2012, pp. 1-8 (2012).

Burns et al. "Vertebral Body Compression Fractures and Bones Density: Automated Detection and Classification on CT Images", Radiology: vol. 000: No. 0-2017, radiology.rsna.org, p. 1-27 (2017).

Bar et al: "Compression Fractures Detection on CT", The Blavatnik School of Computer Sciences, Tel Aviv University Zebra Medical Vision, Medical Imaging 2017: Computer-Aided Diagnosis, Proc. Of SPIE vol. 10134, pp. 1-8 (2017).

Ito et al. "Multi-Detector Row CT Imaging of Vertebral Microstructure for Evaluation of Fracture Risk", Journal of Bone and Mineral Research, vol. 20, No. 10, 2005, Published online on Jun. 20, 2005, 2005 American Society for Bone and Mineral Health, pp. 1-9 (2005).

Bauer et al., "Detection of Osteoporotic Vertebral Fractures Using Multidetector CT," International Osteoporosis Foundation and National Osteoporosis Foundation 2005, Osteoporos Int 17: pp. 608-615 (2006).

Korez et al., "Model-Based Segmentation of Vertebral Bodies from MR Images with 3D CNNs," Springer International Publishing AG 2016, S. Ourselin et al. (Eds.): MICCAI 2016, Part II, LNCS 9901, pp. 433-441, (2016).

Corresponding Search Report for PCT/EP2018/082925.

Roth Holger R et al: "Deep convolutional networks for automated detection of posterior-element fractures on spine CT," Progress in Biomedical Optics and Imaging, SPIE—International Society for Optical Engineering, Bellingham, WA, US, vol. 9785, Mar. 24, 2016 (Mar. 24, 2016), pp. 97850P-97850P, XP060070462, ISSN: 1605-7422, DOI: 10.1117/12.2217146, ISBN: 978-1-5106-0027-0.

Darko Tern et al: "Parametric modelling and segmentation of vertebral bodies in 3D CT and MR spine images; Parametric modelling and segmentation of vertebral bodies in 3D CT and MR spine images", Physics in Medicine and Biology, Institute of Physics Publishing, Bristol GB, vol. 56, No. 23, Nov. 11, 2011 (Nov. 11, 2011), pp. 7505-7522, XP020214023, ISSN: 0031-9155, DOI: 10.1088/0031-9155/56/23/011.

Wang Yinong et al: "Multi-atlas Segmentation with Joint Label Fusion of Osteoporotic Vertebral Compression Fractures on CT", Jul. 1, 2016 (Jul. 1, 2016), International Conference on Simulation, Modeling, and Programming for Autonomous Robots, Simpar 2010; [Lecture Notes in Computer Science; Lect.Notes Computer], Springer, Berlin, Heidelberg, pp. 74-84, XP047351141, ISBN: 978-3-642-17318-9.

\* cited by examiner

THREE-DIMENSIONAL MEDICAL IMAGE ANALYSIS METHOD AND SYSTEM FOR IDENTIFICATION OF VERTEBRAL FRACTURES

The present disclosure relates to medical image analysis and provides a system and a method for identification of bone fractures in 3D images, more specifically vertebral fractures.

BACKGROUND

Osteoporosis is a disease affecting bones where increased bone weakness increases the risk of bone fractures. Common osteoporotic fractures occur in the vertebrae in the spine, the bones of the forearm, and the hip. Every 3 seconds an osteoporotic fracture occurs, with vertebral fractures being the most common (Johnell et al, 2006). Vertebral fractures are predictive of subsequent fractures, e.g. patients with moderate or severe vertebral fractures have 4.8 to 6.7 times higher risk of subsequent hip fracture (Buckens et al., 2014). Roux et al demonstrated that 1 out of 4 patients with incident mild vertebral fractures will most probably have a fracture again within subsequent 2 years (Roux et al., 2007).

Clinical assessment of vertebral fractures is difficult because many patients are unaware that they have suffered a vertebral fracture. It is estimated that only one-third of vertebral fractures come to clinical attention (Cooper et al., 1992) and 54% of vertebral fractures are under-reported by radiologists in spine-containing CT (Mitchell et al., 2017). Despite efforts from the International Osteoporosis Foundation to raise awareness of vertebral fractures and provide training on vertebra fracture detection, bone care givers in clinical centers have little means for screening and early-stage diagnosis of patients with vertebral fractures.

Common approach to image analysis for radiologists involves looking at a specific 2D slice of a 3D image depending on the question posed. This limits the image analysis step to a specific question and eliminates potentially valuable information in the original 3D image. Current radiology practice grades vertebral fractures according to Genant's semi-quantitative Vertebral Fracture Assessment (VFA) method (Genant et al., 1993). This method assesses the vertebral body morphology in X-ray images or at/around the mid-sagittal plane in 3D image modalities (CT, MR). As reported in Buckens et al. (2013) the intra and inter-observer reliability and agreement of semi quantitative VFA on Chest CT is far from trivial on patient and vertebra level.

Vertebral compression fractures vary greatly in appearance and extent (Schwartz and Steinberg, 2005). The majority of publications on vertebral fracture detection are inspired by how radiologists apply the Genant's classification: firstly, they attempt to segment the vertebrae at high accuracy, secondly, the endplates are detected and, finally, the height loss of each vertebra is quantified in order to detect vertebral fractures.

U.S. Pat. No. 8,126,249 discloses a shape-based model method for detection osteoporotic fractures. Klinder et al. (2009) applies a model-based approach to automatically detect, identify and segment vertebrae in CT. This method has been clinically validated in a cross-sectional and longitudinal study involving 80 patients studied on one Siemens MDCT scanner. Anterior, middle and posterior height decrease is used to report graded vertebral fractures from T5 to L5 according to the Genant classification. Baum et al. (2014) reports results for this method with ROC analysis on height ratio and execution performance of 50 minutes on average per MDCT examination. (Yao et al., 2012) detects and localizes compression fractures using an axial height compass that leverages 3D information present in CT. This method has recently been discussed in a cross-sectional study involving 150 patients with control group reporting the anatomical localization and categorization of vertebral compression fractures from T1 to L5 by grade and type (Burns et al., 2017). This study reports vertebral fracture detection with 95.7% sensitivity and 43 false-positive findings using a private dataset of 1275 vertebrae of which 210 thoracic and lumber vertebral bodies are fractured. These results build on a custom definition of vertebra fractures (minimum 10% height loss). A recent publication discusses the use of Convolutional Neural Networks (CNN) and Recurrent Neural Network (RNN) to detect compression fractures at patient-level in CT (Bar et al., 2017). This algorithm uses a 2D CNN on sagittal patches extracted from a segmented spinal column and predicts presence of one or multiple vertebral fracture in a patient image, without localization nor counting of number of fractures.

Buckens et al. (2013) discusses intra- and inter-observer variability and reliability of VFA on CT using three patient- and two vertebra-level measures. The author concludes that the results demonstrate acceptable reproducibility, yet the dataset uses a limited number of images (50) and vertebra fractures (2-4%). A detailed analysis of the presented results shows that a data-driven method using supervised learning has to deal with significant noise on the read-outs provided by a (group of) radiologist(s).

As clinical imaging data volumes keep growing steadily, developing a three-dimensional image processing system and a method is a technical problem of great clinical importance to reduce inter-observer variability and to allow for screening for vertebral fractures. The present invention provides a technical solution in a computer environment by providing a three-dimensional image processing method that analyzes specific data in the images for automated detection of bone fractures in 3D images without performing a detailed segmentation of bone structures.

SUMMARY OF THE INVENTION

The present disclosure provides a three-dimensional medical image analysis system for predicting the presence of a vertebral fracture in a subject, comprising:
- a 3D image processor (101) for receiving and processing 3D image data of said subject, producing two or more sets of 3D voxels, wherein each of the sets corresponds to the entire said 3D image, and wherein each of the sets consists of equal voxels of different dimensions;
- a voxel classifier (104) for assigning said voxels one or more class probabilities of a voxel to contain a fracture using a computational model; and
- a fracture probability estimator (103) for estimating the probability of the presence of a vertebral fracture in said subject.

The present disclosure further provides medical imaging workstation comprising:
- an imaging apparatus for generating at least one 3D image (1401) of a subject and
- a system as disclosed herein for predicting the presence of a vertebral fracture in said subject in at least one generated image.

The present disclosure further provides a three-dimensional medical image analysis method of predicting the presence of a vertebral fracture in an individual, said method comprising the steps of:

receiving a 3D imaging data (201) comprising imaging information of the spinal cord;

processing said image and producing two or more sets of 3D voxels, wherein each of the sets corresponds to the entire said 3D image, and wherein each of the sets consists of equal voxels of different dimensions (202);

computing for each voxel class probability of a voxel to contain fracture using a computational model (204);

identifying if any of said voxels are classified as containing a fracture (205); and predicting the presence of a vertebral fracture (206) in said individual based on the identification of said voxels classified as containing a fracture.

The present disclosure further provides a computer program comprising code means for performing the steps of the method, wherein said computer program execution is carried on a computer.

The present disclosure also provides a non-transitory computer-readable medium storing thereon executable instructions, that when executed by a computer, cause the computer to execute the method for predicting the presence of a vertebral fracture in an individual.

BRIEF DESCRIPTION OF THE DRAWINGS

Embodiments of present invention are described below by reference to the following drawings, in which.

DETAILED DESCRIPTION OF THE INVENTION

The present disclosure uses machine learning methods to analyze imaging data and make predictions of bone fractures in 3D images, more specifically in CT images.

In particular the present disclosure provides a three-dimensional medical image analysis system for predicting the presence of a vertebral fracture in a subject, comprising: a 3D image processor (101) for receiving and processing 3D image data of said subject, producing two or more sets of 3D voxels, wherein each of the sets corresponds to the entire said 3D image, and wherein each of the sets consists of equal voxels of different dimensions; a voxel classifier (104) for assigning said voxels one or more class probabilities of a voxel to contain a fracture using a computational model; and a fracture probability estimator (103) for estimating the probability of the presence of a vertebral fracture in said subject. Optionally such system may additionally comprise a spinal cord detector (102) for detection of the part of said image comprising the spinal cord. This allows to reduce the number of voxels to be analyzed and classified and significantly reduces the computer processing time.

Each of the elements of the system is a sub-system that is performing a specific set of steps. The exemplary steps for each of the sub-systems (elements) are illustrated in FIGS. 5-12. Each of such sub-systems can have one or more input data (or signals) and one or more outputs.

Figure 1:
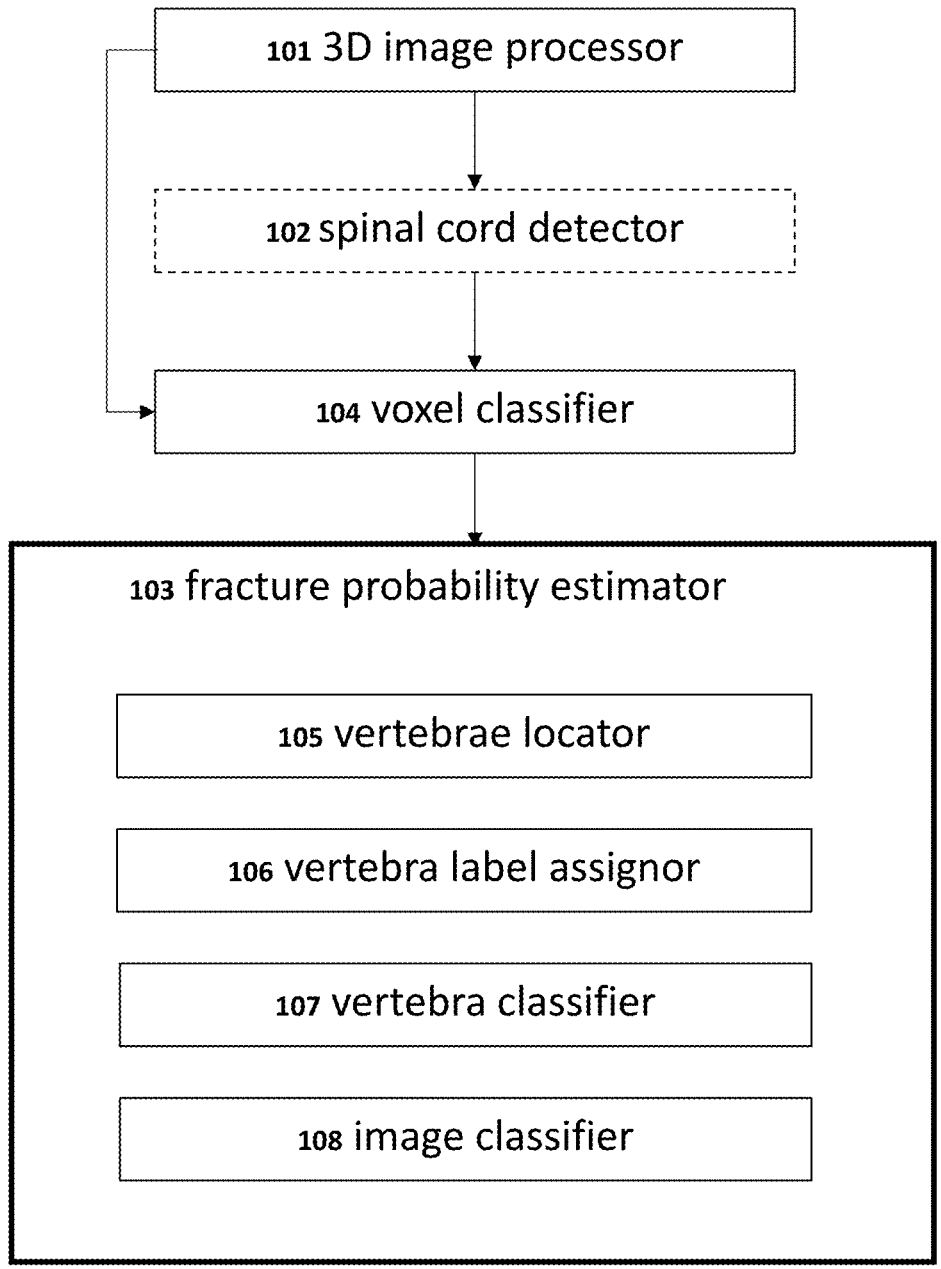
FIG. 1 is a block diagram of a system for identification of fractures in a 3D image.
Figure 2:
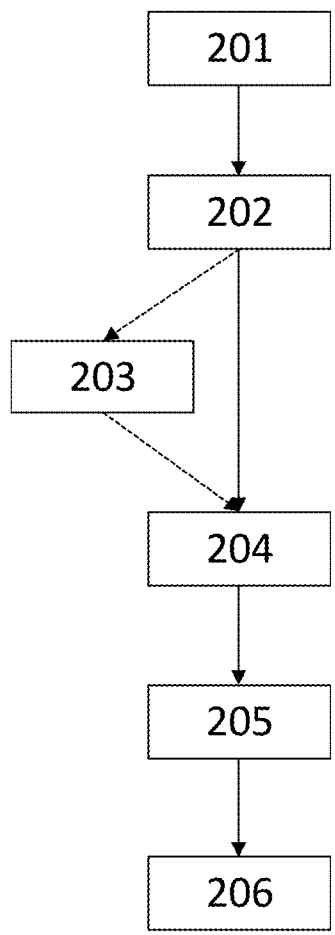
FIG. 2 shows a block diagram of a method for identification of fractures in a 3D image.
Figure 3:
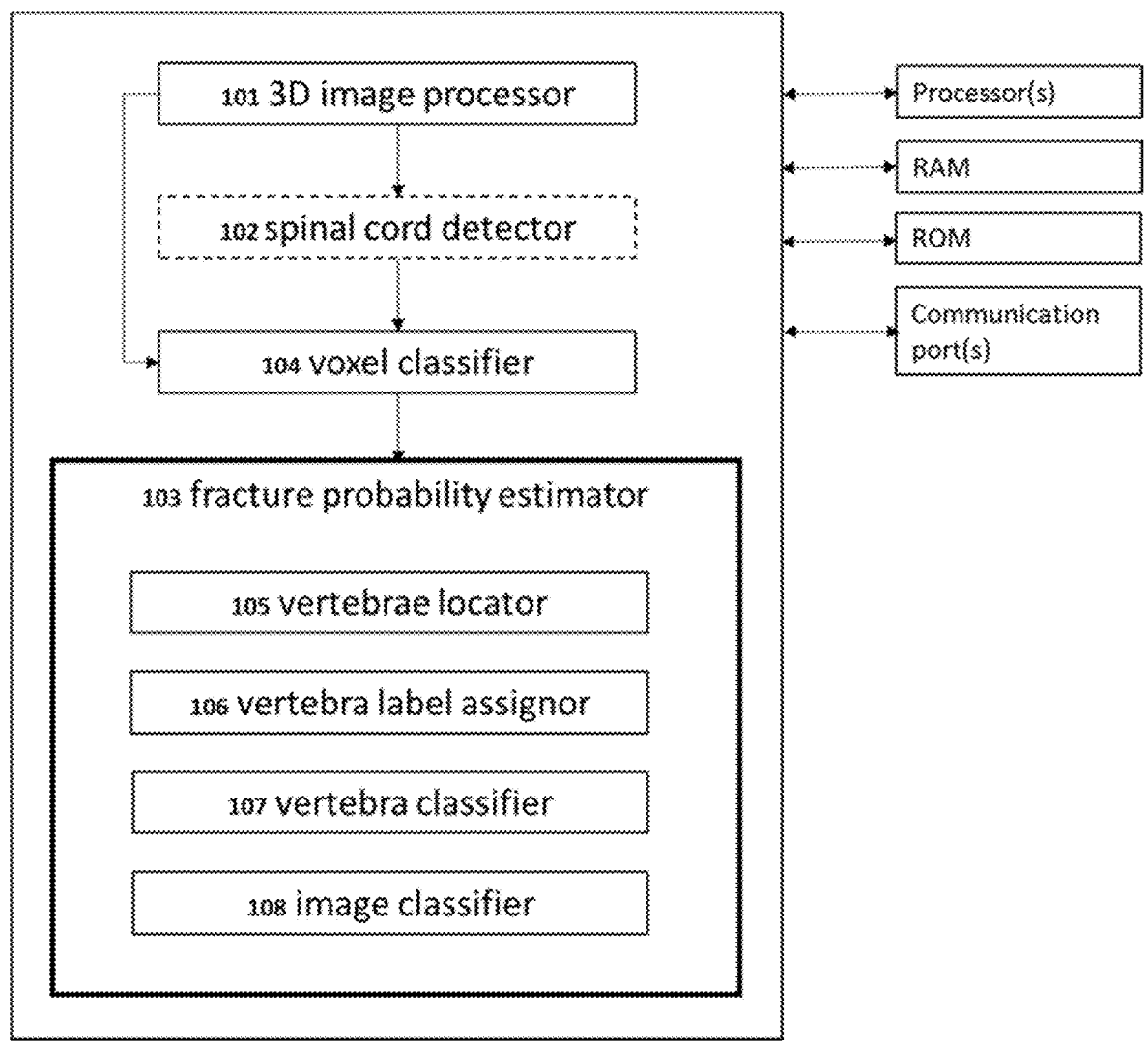
FIG. 3 is a schematic drawing of the system for identification of fractures comprising additional elements.
Figure 4:
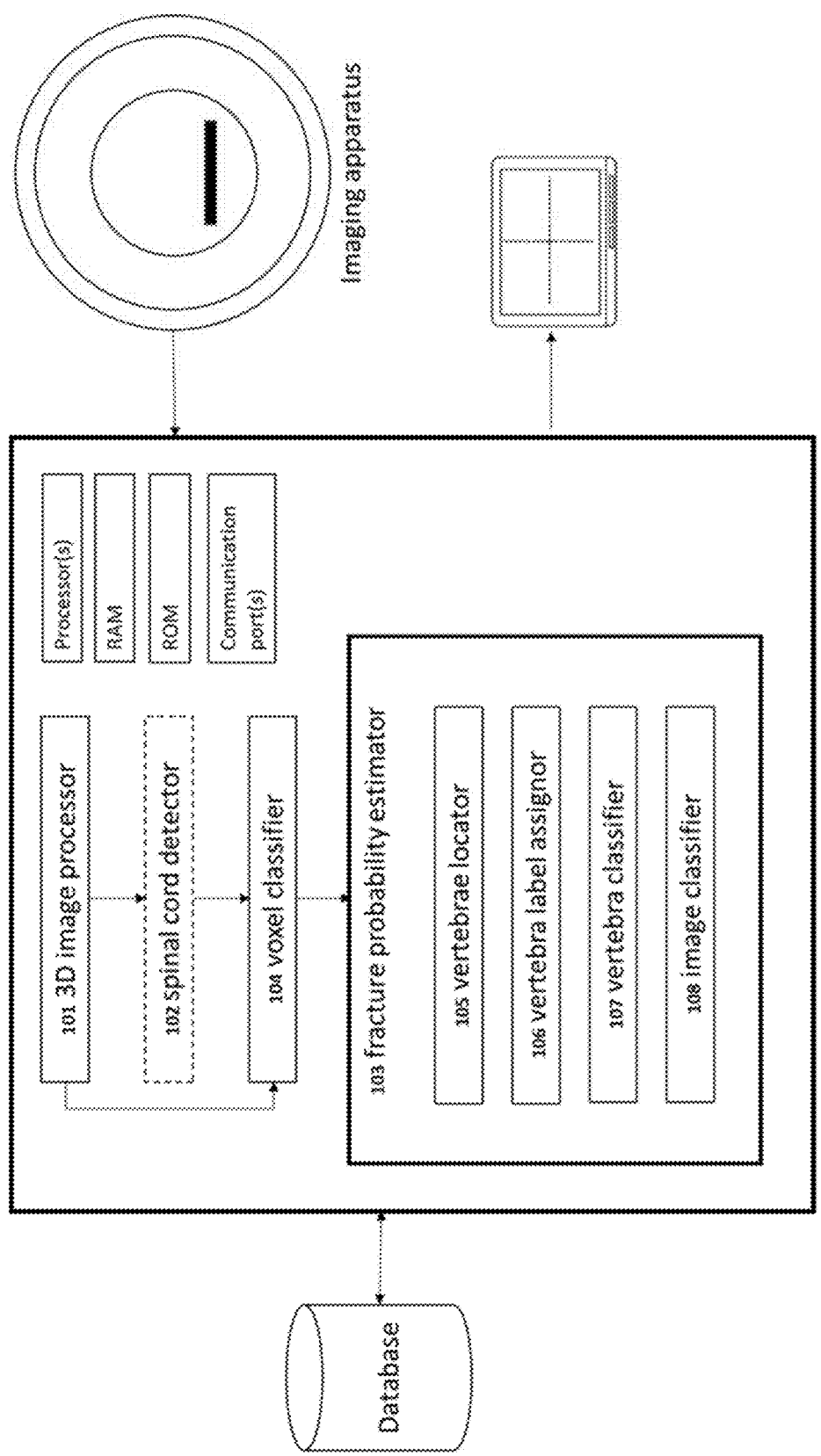
FIG. 4 is a schematic drawing of the imaging workstation according to an embodiment of the invention.
Figure 5:
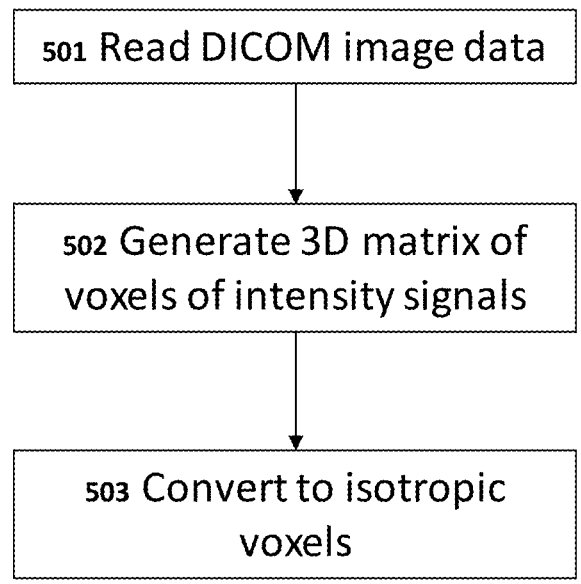
FIG. 5 is a flowchart depicting operational steps of the 3D image processor
Figure 6:
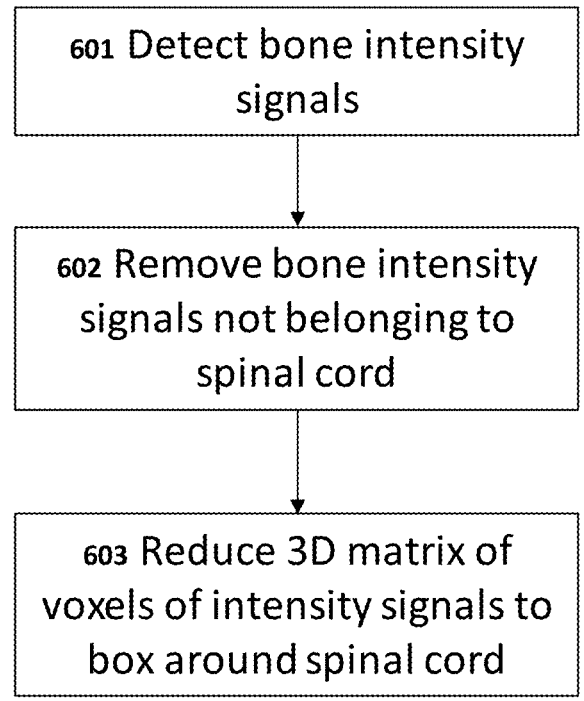
FIG. 6 is a flowchart depicting operational steps of the spinal cord locator.
Figure 7:
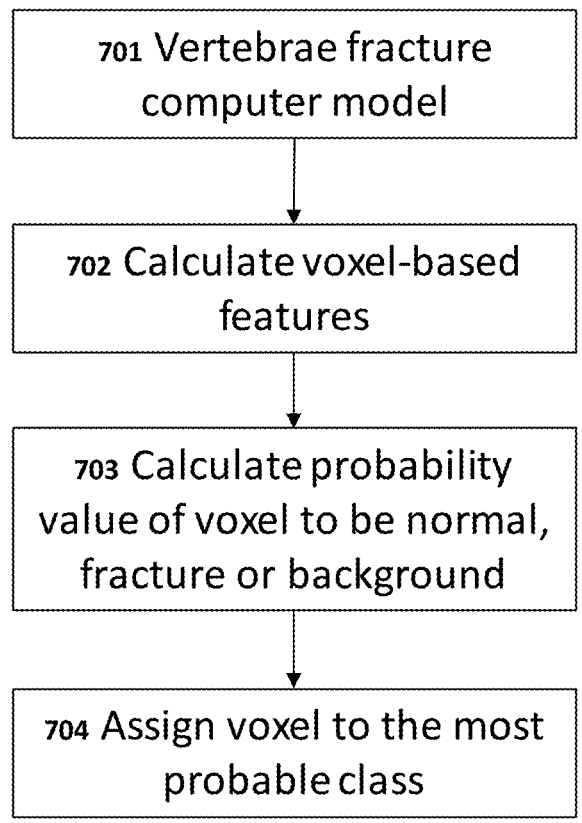
FIG. 7 is a flowchart depicting operational steps of the voxel classifier.
Figure 8:
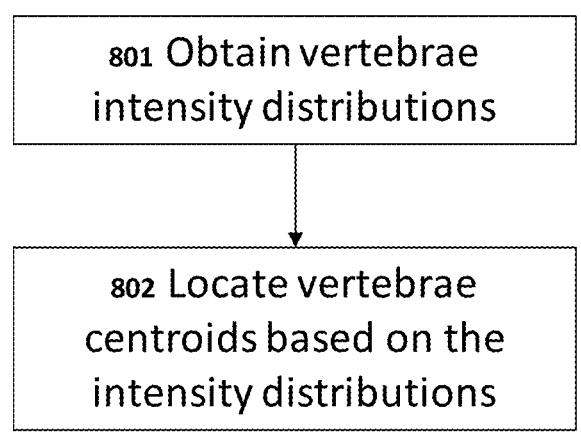
FIG. 8 is a flowchart depicting operational steps of the vertebra locator.
Figure 9:
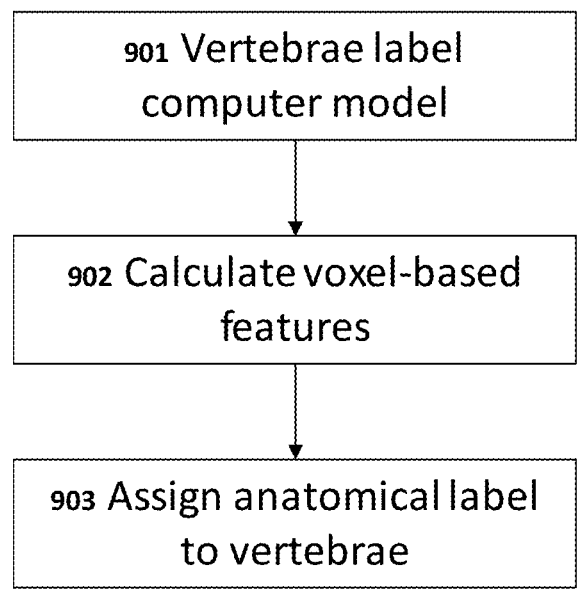
FIG. 9 is a flowchart depicting operational steps of the vertebra anatomical label assignor.
Figure 10:
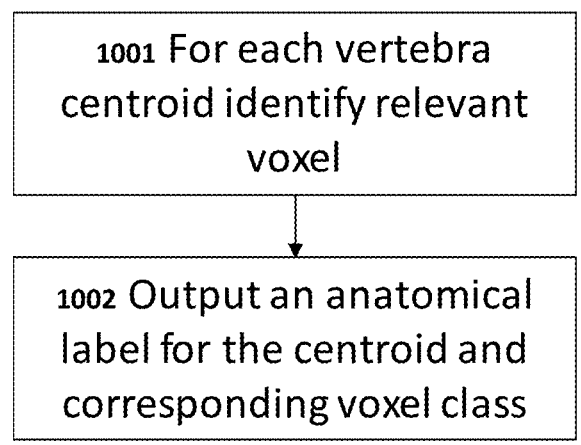
FIG. 10 is a flowchart depicting operational steps of the vertebrae classifier.
Figure 11:
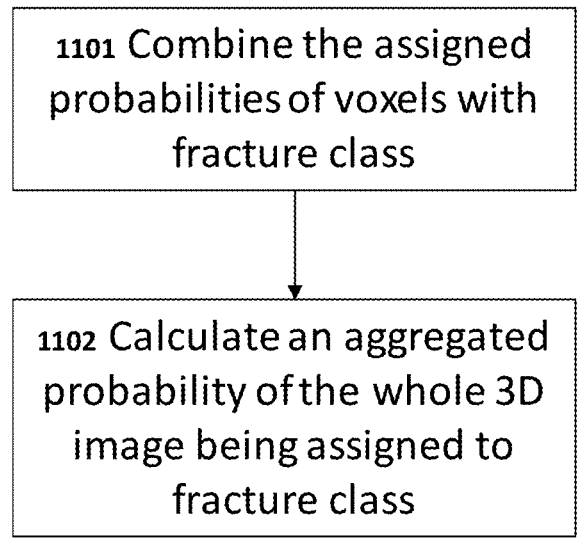
FIG. 11 is a flowchart depicting operational steps of the image classifier.

FIG. 1 is a block diagram illustrating aspects of a three-dimensional medical image analysis system for predicting the presence of a vertebral fracture in a subject. Only the elements relevant for this disclosure have been illustrated. The system may be implemented, for example, using a suitable one or more microprocessors. Additional elements of the system are illustrated in FIG. 3. For example, a computer program is provided on a computer-readable medium to implement the system on said microprocessor. Said system might comprise a memory for storing the software, memory for storing the data, communication port for communicating with other devices, for example, wired or wireless network connection. Such port might be used to receive the image data and provide data and processed signals produced by the system. The system may further comprise a user interface and a user input device for interacting with it. Such system can be used to display the 3D images and the results generated by the system.

The image processor (101) slits the 3D image data it receives into a set of 3D voxels. The image processor (101) can receive said 3D image via a computer network or via another communication port that is configured to interact with an image source. Such image source might be an imaging database, an imaging computer, or an imaging apparatus recording such images. The 3D image data might comprise image intensities, said image intensities having a signal dynamic range.

In one embodiment the image processor (101) produces a set of isotropic voxels of 1 mm$^3$. In yet another embodiment the image processor produces two sets of voxels representing an entirety of same image, including a set of first voxels of a first size and a set of second voxels of a second size. In one embodiment, the first voxels may each be isotropic voxels of 1 mm$^3$ and the second voxels may each be isotropic voxels of 3 mm$^3$ Such isotropic sizes significantly simplify the subsequent steps. In one particular embodiment image processor (101) outputs a set of 3D voxels, wherein said 3D voxels are anisotropic voxels.

In another embodiment said image processor (101) outputs a set of 3D voxels that are normalized to mean and unit standard deviation of the intensities of said voxel. One normalizes voxel intensities in an image to zero mean and unit variance. These additional pre-processing steps provide uniform intensities and scales to the voxel classifier (104), avoiding the computational model to learn this intensity normalization as a sub-task. When such image preprocessing steps are not performed upfront, the machine learning model would have to implicitly learn this intensity normalization in the training data set. If not, it would get 'offset' by variations in intensity ranges between different images and would learn generalized image features relevant for the task.

The spinal cord detector (102) uses maximum signal intensities to roughly locate the spinal cord in said image data. In particular the signal intensities can be processed using Cumulative Distribution Function (CDF)>=0.9895. CDF is a statistical function that outputs the probability of finding a value in a random variable (in this case signal intensity). The spinal cord detector locates bone densities (very high intensity values in CT) by considering the intensities with very high CDF values. The advantage of using CDF compared to just using image intensity values is its robustness. While just using the intensity values allows to put a simple threshold on the intensity values, different scanners provide slightly different intensity values for bone tissue and this might lead to less accurate analysis. The use of a CDF allows to take into account the dynamic range of intensities making the analysis more robust. Additionally the spinal cord detector (102) might use the anatomical prior information to coarsely locate the spinal cord along the x, y and z axes. Abdomen and thorax CT examinations contain a broad field-of-view to capture all tissues and analyze for a broad range of indications. In principle voxel classification can be performed on every voxel of the image. The present disclosure focuses on voxels around the spine to avoid unnecessary computations on voxels in lungs, ribs, and other non-related anatomic structures.

The spinal cord detector (102) can utilize the signal intensities and location priors that are valid for spine in CT images. More particularly, the hyper-intense bone intensities can be identified to locate the spine boundaries as described above and refine this further observing that the spine is located centrally along the x-axis (left to right) and posterior (except for cases of severe scoliosis) along the body. The output image generated by the spinal cord detection is a spine-cropped volume that reduces the volume of voxels to process further in downstream steps by a factor 15 on average.

The voxel classifier (104) can receive the 3D image data from either spinal cord detector (102), e.g., in the form of at least two spine-cropped output images each having different voxel sizes, or directly from 3D image processor (101), e.g., in the form of at least two images (two image data sets) each having different voxel sizes.

In a particular embodiment the voxel classifier (104) classifies each of said voxels in said one or more sets of voxels in the context of the surrounding voxels.

In more specific embodiment, the voxel classifier (104) classifies each of said voxels in the context of the surrounding voxels, and classifies each of the voxels in the first set in the context of 30-40 $mm^3$ of said voxels with the voxel of interest located in the center and each of the voxels in the second set in the context of 90-120 $mm^3$ of said voxels with the voxel of interest located in the center. Specifically the first set of 3D voxels is a set of isotropic voxels of 1 $mm^3$, and the second set of 3D voxels is a set of isotropic voxels of 3 $mm^3$.

In a particular embodiment the voxel classifier (104) is utilizing a Convolutional Neural Network (CNN). An example set of such network is provided in FIG. 3. CNNs have been applied successfully to classification, object detection and segmentation tasks. CNN architectures have been applied to various 2D image tasks and improvements such as batch normalization (Ioffe and Szegedy, 2015), inception modules (Szegedy et al., 2015) and residual connections (He et al., 2016) have pushed performance beyond human level in the ImageNet competition (classification of objects in natural images). Surprisingly, only a small fraction of the published methods fully exploits the 3D data structure available in CT and MRI. Recent work from Cicek et al. (2016) and Kamnitsas et al. (2017) have successfully applied 3D CNNs to microscopy and MRI images with architectures optimized to cope with the increased memory and computations.

CNNs are built up of layers that each process individual voxels using convolutions that slide a filter window across the entire input image. The filter size determines how many voxels contribute to the output of the center voxel (e.g. a 3D filter of size 3×3×3 implies that the center voxel outputs a weighted sum of intensities from all the neighboring voxels). Typically, every layer has multiple filters to learn various features and a CNN consists of multiple layers to build a sufficiently large receptive field. The receptive field can be interpreted as the size of the structures that the final CNN layer can see.

The CNN network for a classification typically has at its end two fully connected layers and a classification layer. All layers are trained end-to-end implying that the learned features are meaningful for the classification at hand. CNNs have gained much interest after publications of successfully training models on one dataset and transferring these features to tackle a different task. The transfer learning techniques build on the observation that the first CNN layers learn generic features (e.g. edges and corners) and the higher CNN layers combine these into more specific features relevant for the task at hand (e.g. face of a cat or shape of car wheels).

In a specific embodiment the voxel classifier (104) is utilizing a CNN comprising a set of neural network layers, wherein the sequence of neural network layers comprises:
  for each set of voxels, one or more convolutional layers configured to receive an input derived from said set of voxels in the context of the surrounding voxels to generate two or more convolved outputs
  one or more fully connected layers for aggregating said two or more convolved outputs; and
  a classification layer receiving an input from said one or more fully connected layers to perform final classification.

The one or more convolutional layers can be designed as two convolutional layers. The use of two sets of voxels at the start (each having the same amount of voxels of different sizes) will provide two convolved outputs. Each set of voxels is being analyzed using its own separate CNN network.

The one or more connected layers allow to aggregate the outputs produced from each of the sets of voxels. The convolved outputs from one or more convolutional layers can be interpreted as learned features. When using two set of voxels (analyzed through two CNN networks), this will produce two sets of features learned in different context (e.g. one looking at high-resolution images and the other looking at bigger part of the image but lower resolution/more blurry images). The one or more connected layers add or otherwise stack these features all together in one big feature vector. The last fully connected layers process these feature vectors once more (non-linear operations) in order for the final classification layer (next bullet) to output one probability for every class and this for every voxel in the input image (so probability 1 of that voxel being a background voxel, probability 2 of that voxel being a normal vertebra voxel, probability 3 of that voxel being a fractured vertebra voxel).

The output of the classification layer is a probability value for each class. For an input image comprising N×M×K voxels (3D), the output is N×M×K voxels with each containing one probability value for every class.

The CNN may further comprise additional aggregation and convolutional layers. More specifically the CNN exemplified above additionally comprises an aggregation layer for aggregating the output from said one or more convolved outputs;

one or more convolutional layers receiving an input from said aggregated output from first and the second convolved outputs.

More particularly the CNN uses a sliding filter having size of $3^3$ voxels.

Figure 12:
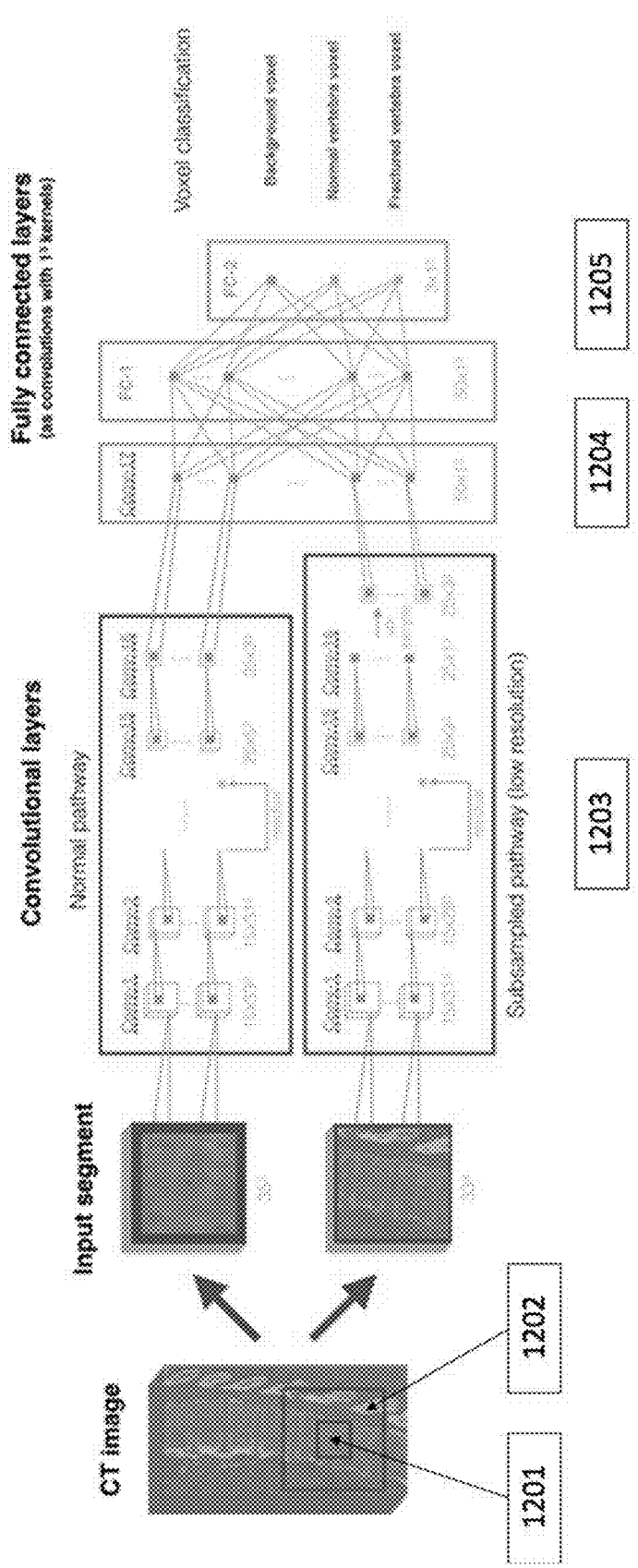
FIG. 12 shows the design of the CNN for voxel and final image classification.

More specifically the CNN used in classification in accordance with one preferred embodiment includes 17 convolution layers with each filters of size $3^3$ in order to have an effective receptive field of $35^3$ in the normal pathway (first set of voxels of 1 mm$^3$) and $105^3$ in the subsampled pathway (second set of voxels of 3 mm$^3$) (FIG. 12). This selection is driven by the empirical observation that an average human vertebra is maximum 54 mm wide, hence a receptive field of minimum 100 voxels (isotropic 1 mm$^3$ input images) is required to have all voxels inside a vertebra contribute when evaluating any vertebra voxel. Adding a convolution layer after the normal and subsampled pathways are stacked together further smoothens the results and improves the performance of the system.

The voxel classifier (104) classifies each voxel by assigning a probability of one or more classes per voxel. Any suitable classifier might be chosen. Different classification techniques are well known to the skilled person. Each specific classifier might require adjustments in each component of the system. In a particular embodiment the voxel classifier (104) classifies each voxel in the groups of voxels using a pre-trained classifier by assigning one or more class labels to said voxel.

In a particular embodiment the voxel classifier (104) calculates for each voxel a probability to be classified as background, normal, fracture class.

In a particular embodiment the voxel classifier (104) is pre-trained using a set of annotated input 3D images divided into voxels, wherein an intensity noise signal is added to each 3D voxel along x, y and z axis. Data augmentation is performed by adding noise to the input intensities and randomly rejecting images across X, Y and Z axes. This increases the robustness of the system to cope with high variability in input images (different scanners, different patient positions).

In a particular embodiment the voxel classifier (104) is utilizing a CNN is pre-trained using a set of annotated input 3D images using sampling ratio using a sampling ratio to favor foreground, more specifically sampling ratio of background:normal:fracture can be 1:3:3. Such ratio allows for sufficient examples to remove the background first and then focus on differentiating between normal and fractured vertebrae.

The techniques such as residual connections (He et al., 2016), batch normalization (Ioffe and Szegedy, 2015) and parametric rectified linear unit (PReLU) non-linearity (He et al., 2015) might be applied to the CNN. RmsProp optimizer, L1 and L2 regularization, can be applied to anneal the learning rate of 0.001 exponentially and train for 35 epochs.

The classification network can be implemented, for example, using the 3D CNN as described in Kamnitsas et al. (2017), a voxel-classification pipeline built in Theano (the code base available on Github). DeepMedic software (https://github.com/Kamnitsask/deepmedic) can be used to perform weighted sampling to counter class imbalance, generate a combination of normal and subsampled pathway to increase context and finally a dense training scheme on image segments to cope with memory and computation constraints that are observed with such 3D CNNs.

The CNN can be trained using a training data set that can be produced using a semi-manual method. Voxel classification using supervised learning techniques requires one label per voxel. This is a very expensive labeling task that could require more than one hour per image in order to perform the classification.

One of the possible ways of such classification is described in Glocker et al. (2013) uses a dense classification from sparse annotations scheme to bring down the manual annotation time per image to two minutes on average. This scheme fits a Gaussian centroid likelihood function $\psi_v$ around vertebra centroid coordinates $c_v$. The centroid coordinates are provided through manual annotation (free parameter $h_v$ is determined empirically to nicely cover every vertebra with non-overlapping point clouds). Manually annotating one centroid point per vertebra suffices to build a dense label point cloud for every vertebra. The list of vertebrae in the field-of-view v is dynamic and depends on the input image.

$$\psi_v(x) = \exp\left(-\frac{c_v - x}{h_v}\right)$$

The read-out is limited to one Genant classification per vertebra present in the field-of-view and a label image L is automatically generated with the same dimensions as the spine-cropped intensity image I. The resulting label image is not voxel-perfect using the described methodology, but such method is sufficiently accurate for the detection task at hand. This step produces a 3D image L with the same size (dimensions) as the input image I that has intensity values 0 for background voxels, 1 for normal vertebrae voxels and 2 for fractured vertebrae voxels. The voxel intensities are semi-automatically generated as per the above method. The result of this step is a training database with K pairs of an image I and label image L that can be fed into a CNN classifier.

The fracture probability estimator (103) is a sub-system that uses the voxels classification output possibly combined with other additional information to provide with the estimations of the probability of a vertebrae fracture being present in the image. Such probability can be provided for the whole image or a part of the image.

In a particular embodiment the fracture probability estimator (103) comprises an image classifier (108). The image classifier (108) is configured to classify said 3D image into having or not having a fracture and receives an input from the voxel classifier (104) for each voxel of said 3D image and provides an output of an aggregated probability value for said 3D image, such aggregated probability estimated empirically through optimizing a performance metric (for example, sensitivity/specificity or precision/recall). Alternatively, the count of the number of voxels having assigned probability of fracture class can be used.

In another embodiment the image classifier (108) is configured to classify the 3D image based on the minimum threshold value of the number of voxels having assigned probability of fracture class.

In another embodiment the fracture probability estimator (103) comprises a vertebrae locator (105) in the 3D image. The fracture probability estimator (103) may comprise a vertebrae locator (105) and vertebra anatomical label assignor (106).

In another embodiment the fracture probability estimator (103) may additionally comprise a vertebra classifier (107) that outputs a probability for each vertebrae in the 3D image to have a fracture. Such classifier can be configured to work with vertebrae locator (105) and vertebra anatomical label assignor (106). The vertebrae locator (105) can be configured to produce centroid coordinates of each vertebra within the 3D image. The vertebra anatomical label assignor (106) can be used to assign anatomical level information to each vertebrae in the 3D image. Such information can be useful to assist with visualization of the prediction results. The vertebra classifier (107) combines all the components into the following answer for an input image. For every vertebra present in the image (these are automatically detected by the method): a fracture label (e.g. normal or fractured vertebra), vertebra centroid (localization in 3D space), vertebra anatomical label (e.g. L5, L1, T12 etc.). So instead of providing one vertebra fracture prediction for the entire 3D image (output of 108), 107 provides it per vertebra present and localizes this vertebra in the image (both physically in space and by using an anatomical label).

The present disclosure further provides a medical imaging workstation comprising an imaging apparatus for generating at least one 3D image (1401) of a subject and a system as described herein for predicting the risk of a vertebral fracture in said subject in at least one generated image. Such apparatus may be in a form of a device with a screen and an input device for selecting an image and reviewing the output of the system. The system can also interact with the imaging apparatus remotely via a computer network. The elements of such imaging workstation might be distributed between different servers and a database system might be used to store the imaging data, computational model, intermediate outputs of the different elements of the system as well as for storing the final output. Such database system might also be distributed between different servers and different data might be stored on different servers.

The present disclosure also provides a three-dimensional medical image analysis method of predicting the presence of a vertebral fracture in an individual, said method comprising the steps of:
receiving a 3D imaging data (201) comprising imaging information of the spinal cord;
processing said image and producing two or more sets of 3D voxels, wherein each of the sets corresponds to the entire said 3D image, and wherein each of the sets consists of equal voxels of different dimensions (202);
computing for each voxel class probability of a voxel to contain fracture using a computational model (204);
identifying if any of said voxels are classified as containing a fracture (205); and
predicting the presence of a vertebral fracture (206) in said individual based on the identification of said voxels classified as containing a fracture.

In a particular embodiment the method additionally comprises a step of locating within said image the spinal cord and generating spine-cropped output images for each set of voxels including the spinal cord (203) and outputting sets of voxels including the spinal cord. Such step would follow the step of the image processing (202).

In a particular embodiment the 3D imaging information is received via a computer network. Alternatively such imaging information is received via a communication port that is configured to communicate with an image information generating device or a system. More particular the imaging information is stored in a medical images database.

In a more specific embodiment of the method the voxel classification is performed using a model trained using a training data set generated using a method comprising following steps:
i. inputting via a user interface the centroid coordinates for each vertebra in the training image;
ii. inputting via a user interface a vertebra fracture label;
iii. fitting a Gaussian centroid likelihood function around selected centroid coordinates;
iv. producing a dataset of pairs of signal intensity and label for each of said images in the training data set.

More specifically the computation model is trained on a set of pre-annotated images. Such images might be annotated using the method described above that relies on the manual location of the centroid coordinates and subsequent application of a Gaussian centroid likelihood function. Furthermore the vertebra state is evaluated by an expert to assign a classification label to it. Such classification label might be normal of fracture or could also indicate a grade of fracture.

In a particular embodiment the computation model is trained on a set of pre-annotated images that have been divided into a set of voxels. In one embodiment an intensity noise signal is added to each produced 3D voxel along x, y and z axis.

In another embodiment the step of locating within said image the spinal cord (203) is based on the identification of maximum signal intensities to locate the spinal cord in said image data. In particular the signal intensities can be processed using Cumulative Distribution Function (CDF) $>=0.9895$ as described above. Alternatively, the step of locating within said image the spinal cord (203) can additionally use the anatomical prior information to coarsely locate the spinal cord along the x, y and z axes In another embodiment of the method, the step of processing and dividing said image into a set of voxels (202) outputs a set of 3D voxels, wherein said 3D voxels are isotonic isotropic voxels of 1 mm$^3$. Such size is advantageous for the reasons described above.

In another embodiment of the method, the step of processing and dividing said image into a set of voxels (202) outputs a set of 3D voxels, wherein said 3D voxels are anisotropic voxels.

In another embodiment of the method, the step of processing and dividing said image into a set of voxels (202) additionally comprises a step of normalization to mean and unit standard deviation of the intensity of said voxel.

In another embodiment of the method the step of processing and dividing said image into a set of voxels (202) additionally comprises a step of adding intensity noise signal to each produced 3D voxel along x, y and z axis In another embodiment of the method, the step of computing for each voxel class probability of a voxel to contain fracture using a computational model (204) comprises classification of each voxel by assigning a probability of one or more classes per voxel.

In another embodiment of the method, the step of computing for each voxel class probability of a voxel to contain fracture using a computational model (204) includes two classifications of each of said 3D voxels in each set in the context of the surrounding set of voxels. More specifically such classification of each of said voxels is performed in the context of the surrounding voxels, and classifies each of the voxels in the first set in the context of 30-40 mm$^3$ of said voxels and each of the voxels in the second set in the context of 90-120 mm$^3$ of said voxels. In a specific embodiment the first set is classified in the context of 35 mm$^3$ of said voxels and the second set is classified in the context of 105 mm$^3$ of said voxels. More specifically in this case the first set of voxels is a set of voxels of 1 mm$^3$ and the second set of voxels is a set of voxels of 3 mm$^3$.

In another embodiment of the method, the step of computing for each voxel class probability of a voxel to contain fracture using a computational model (204) uses a classifier to classify each voxel in the groups of voxels using a pre-trained classifier by assigning one or more class labels to said voxels.

In another embodiment of the method, the step of computing for each voxel class probability of a voxel to contain fracture using a computational model (204) produces an output probability to be classified as background, normal, fracture class for each voxel in the image.

In another embodiment of the method, the step of predicting the risk of vertebral fracture (206) includes classification of said 3D image into having or not having a fracture, and wherein said step receives an input classification value from the step of computing for each voxel class probability of a voxel to contain fracture using a computational model (204) for each voxel of said 3D image, and wherein said step provides an output of an aggregated probability value for said 3D image.

In another embodiment of the method, the step of predicting the risk of a vertebral fracture (206) includes classification of said 3D image based on the minimum threshold value of the number of voxels having assigned probability of the fracture class.

In another embodiment the method additionally comprises a step of locating the vertebrae in the image and a step of assigning labels to vertebra present in the 3D image.

In another embodiment the method additionally comprises a step of assigning labels to vertebra present in the 3D image.

In another embodiment the method additionally comprises a step of vertebra classification by assigning a probability of said vertebrae having a fracture. More specifically the step of locating the vertebrae produces centroid coordinates of each vertebra within said 3D image.

In another embodiment of the method the step of computing for each voxel class probability of a voxel to contain fracture using a computational model (204) is utilizing a Convolutional Neural Network (CNN). More specifically the step of computing for each voxel class probability of a voxel to contain fracture using a computational model (204) is utilizing a Convolutional Neural Network (CNN) comprising a set of neural network layers, wherein the set of neural network layers comprises:

for each set of voxels, one or more convolutional layers configured to receive an input derived from said set of voxels in the context of the surrounding voxels to generate two or more convolved outputs;

one or more fully connected layers for aggregating said two or more convolved outputs for each set of voxels; and a classification layer receiving an input from said one or more fully connected layers to perform final classification.

The CNN may further comprise additional aggregation and convolutional layers. More specifically the CNN exemplified above additionally comprises an aggregation layer for aggregating the output from said one or more convolved outputs;

one or more convolutional layers receiving an input from said aggregated output from first and the second convolved outputs;

In another embodiment of the method, the step of computing for each voxel class probability of a voxel to contain fracture using a computational model (204) is utilizing a Convolutional Neural Network (CNN) that is pre-trained using a set of annotated input 3D images using a sampling ratio to favor foreground, more specifically such sampling ratio of background:normal:fracture can be 1:3:3.

In another embodiment the method said 3D image data comprises image intensities, said image intensities having a signal dynamic range.

It will be appreciated that the disclosure also applies to computer programs, particularly computer programs on or in a carrier, adapted to put the systems and the methods of the disclosure into practice. The present disclosure further provides a computer program comprising code means for performing the steps of the method described herein, wherein said computer program execution is carried on a computer. The present disclosure further provides a non-transitory computer-readable medium storing thereon executable instructions, that when executed by a computer, cause the computer to execute the method for predicting the risk of osteoporotic fracture in an individual as described herein. The present disclosure further provides a computer program comprising code means for the elements of the system disclosed herein, wherein said computer program execution is carried on a computer.

The computer program may be in the form of a source code, an object code, a code intermediate source. The program can be in a partially compiled form, or in any other form suitable for use in the implementation of the method and it variations according to the present disclosure. Such program may have many different architectural designs. A program code implementing the functionality of the method or the system according to the disclosure may be sub-divided into one or more sub-routines or sub-components. Many different ways of distributing the functionality among these sub-routines exist and will be known to the skilled person. The sub-routines may be stored together in one executable file to form a self-contained program. Alternatively, one or more or all of the sub-routines may be stored in at least one external library file and linked with a main program either statically or dynamically, e.g. at run-time. The main program contains at least one call to at least one of the sub-routines. The sub-routines may also call each other.

The present disclosure further provides a computer program product comprising computer-executable instructions implementing the steps of the methods set forth herein or its variations as set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files.

It should be noted that the above-mentioned embodiments illustrate rather than limit the invention, and that those skilled in the art will be able to design many alternative embodiments without departing from the scope of the claims. In the claims, any reference signs placed between parentheses shall not be construed as limiting the claim Use of the verb "comprise" and its conjugations does not exclude the presence of elements or steps other than those stated in a claim.

The article "a" or "an" preceding an element does not exclude the presence of a plurality of such elements. The invention may be implemented by means of hardware comprising several distinct elements, and by means of a suitably programmed computer. In the system claim enumerating several elements, several of these elements (sub-systems) may be embodied by one and the same item of hardware. The mere fact that certain measures are recited in mutually different dependent claims does not indicate that a combination of these measures cannot be used.

EXAMPLES

Example 1. Performance of the System for Identification of Vertebral Fractures on a Set of CT Images 120 anonymized image series of abdomen and thorax CT examinations from the imaging database of one university hospital were used for the method described herein. These images were acquired in February and March 2017 on four different scanners (Siemens, Philips and two types of GE scanners) including patients with various indications above seventy years of age (average age was 81 years, range: 70-101, 64% female patients). As a result, this dataset contains a heterogeneous range of protocols, reconstruction formats and patients representing a sample from clinical practice for this patient cohort. The vertebrae distribution contains a total of 1219 vertebrae of which 228 (18.7%) are fractured. The dataset has been curated by one radiologist (S.R.) providing Genant grades (normal, mild, moderate, severe) for every vertebra in the field-of-view.

Table 1 summarizes that the patient-level prediction results using the methodology described herein using four-fold cross-validation on the dataset. In this case we used $N_{patients}$ that is less than $N_{images}$ because the dataset used to train the model contains both abdomen and thorax exams for a subset of the patients.

TABLE 1

Patient fracture present performance using four-fold cross-validation ($N_{patients}$ = 101)

(a) Key metrics

| Metric | This method (%) |
| --- | --- |
| Accuracy | 93.07 |
| Precision | 98.48 |
| Recall | 91.55 |
| Specificity | 96.67 |

(b) Confusion matrix

| This method | Radiologist Fracture | Normal |
| --- | --- | --- |
| Fracture | 65 | 1 |
| Normal | 6 | 29 |
| Totals | 71 | 30 |

We have generated vertebra-level results using noisy ground-truth vertebra centroids. To understand which errors the method makes and what could be the underlying causes (data or algorithm), we have conducted a manual analysis of the vertebra-level errors against radiologist read-out.

Figure 13:
FIG. 13 shows four-fold cross-validation test results using the method described herein: distribution of errors along spine after manual vertebra-level error analysis. FN=False Negative or miss, FP=False Positive or false alert.
Figure 14:
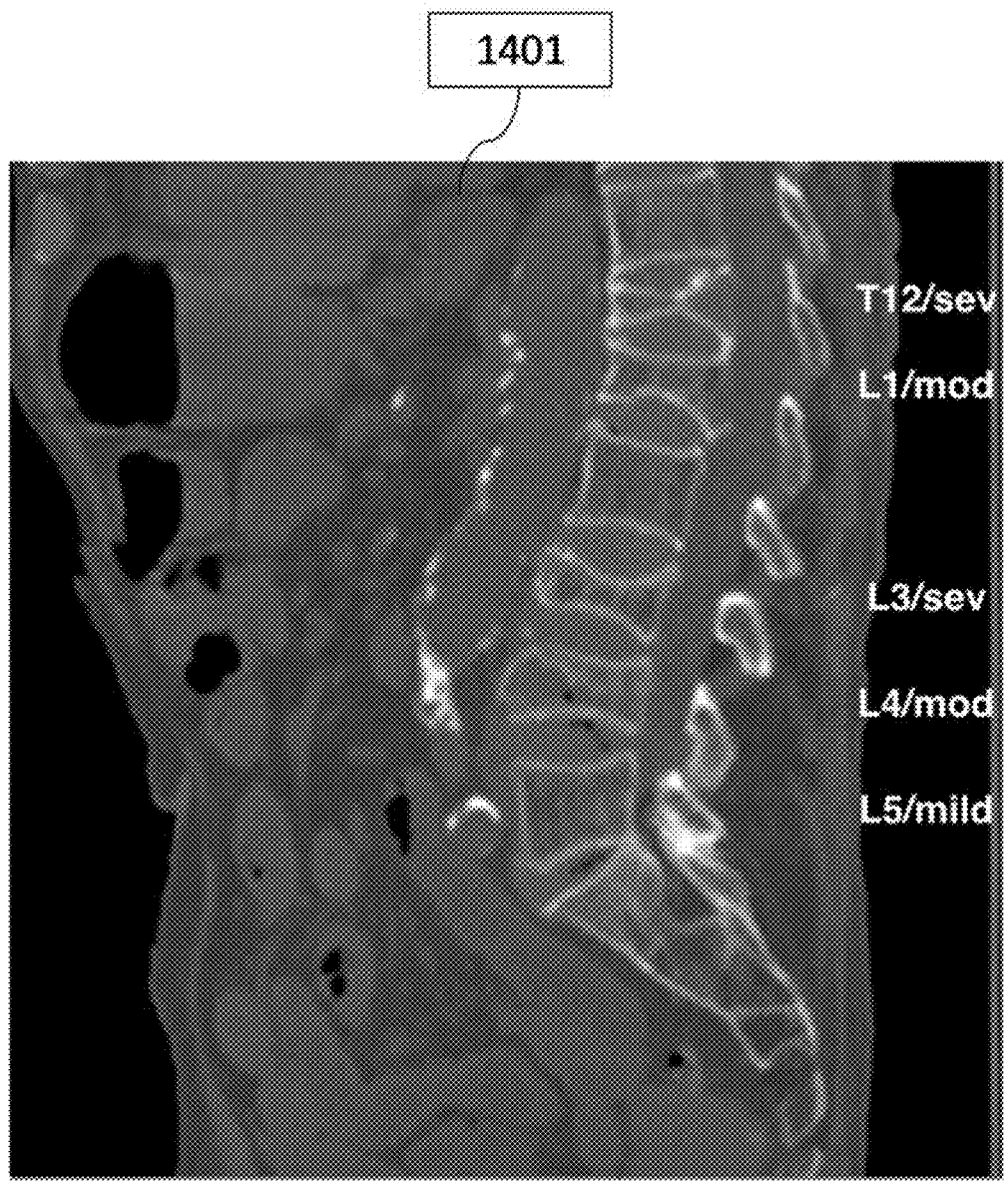
FIG. 14 shows a sample image for which the method correctly classified the fractured vertebrae with different fracture grades as well as all the normal vertebra.

More than two third of the errors occur in thoracic region which can be explained by the skewed dataset (see FIG. 13).

After evaluating the individual errors with a radiologist, we concluded that almost 15% of the errors on mild grade are questionable. This observation clearly demonstrates that the radiologist read-outs used as ground truth labels are noisy (reported as intra- and inter-observer variability in Buckens et al. (2013)).

40% of the vertebra errors involved consecutive mistakes in series of two to six vertebrae. Interestingly, one can see similar results when inspecting the radiologist's read out associated with our dataset. As Genant et al. (1993) describes, one must compare height loss against one reference vertebra (variants using a statistical average across multiple reference vertebrae have been reported (Burns et al., 2017)), it is not surprising that these series cause troubles since they remove the notion of a reference vertebra and using reference vertebrae further away is less evident because vertebra size decreases naturally from inferior to superior.

The test results contain vertebrae which are clinically less relevant for osteoporosis diagnosis (e.g. S1, C7 and C6) and for which the number of examples in the dataset were limited.

The dataset contains a small number of vertebra pathologies (e.g. vertebra fusion, intraspongious hernia, abnormal appearance due to ongoing bone formation process). This results in some errors as their image features are clearly distinct from a normal vertebra and the classifier might confuse these with fractured cases.

Finally, one can see that low-thoracic vertebrae (e.g. L2, T12 and T11) have a relatively high amount of misses (False Negatives) which is consistent with previous work (Burns et al., 2017).

The method was further benchmarked against clinical practice and the most recently reported patient-level fracture detection results. To benchmark the results against clinical practice, we used the inter-observer absolute agreement reported in Buckens et al. (2013) as the accuracy of three observers against one observer (the latter one is thus considered ground truth). The results reported in Table 1a out-perform the patient fracture present accuracy range 82% to 92% reported across four human observers (Buckens et al., 2013). One must note that the voxel classifier has been trained and tested against the same standard while these observers have most likely been independently trained. Nevertheless, the Buckens et al. (2013) results are taken in a clinical study in an academic center where four radiologists receive dedicated fracture grading training beforehand and spend more time per image to classify vertebra fractures (study setting). Since these conditions are favorable against standard radiology practice in any hospital (not just academic), the results are on par with clinical practice. Table 3 compares our method to the patient fracture results reported in (Bar et al., 2017). It must be noted that both results have been generated using different datasets.

TABLE 3

Proxy benchmark for patient fracture present performance (both results have been reported on different test sets).

| Metric | Bar17 (%) | Present method (%) |
| --- | --- | --- |
| Accuracy | 89.1 | 93.07 |
| Precision | NA | 98.48 |
| Recall | 83.9 | 91.55 |
| Specificity | 93.8 | 96.67 |

REFERENCES

Baum et al (2014) Automatic detection of osteoporotic vertebral fractures in routine thoracic and abdominal mdct. European radiology, 24(4):872-880

Buckens et al (2013) Intra and interobserver reliability and agreement of semiquantitative vertebral fracture assessment on chest computed tomography. PloS one, 8(8): e71204

Buckens et al. (2014) Prevalent vertebral fractures on chest ct: higher risk for future hip fracture. Journal of Bone and Mineral Research, 29(2):392-398

Cicek et al (2016) 3d u-net: learning dense volumetric segmentation from sparse annotation. In International Conference on Medical Image Computing and Computer-Assisted Intervention, pages 424-432. Springer Cooper et al (1992) Incidence of clinically diagnosed vertebral fractures: A population-based study in Rochester, Minn., 1985-1989. Journal of Bone and Mineral Research, 7(2):221-227

Genant et al (1993) Vertebral fracture assessment using a semiquantitative technique. Journal of bone and mineral research, 8(9):1137-1148

Glocker et al (2013) Vertebrae localization in pathological spine ct via dense classification from sparse annotations. *In International Conference on Medical Image Computing and Computer-Assisted* Intervention, pages 262-270. Springer He et al (2015) Delving deep into rectifiers: Surpassing human-level performance on imagenet classification. In Proceedings of the IEEE international conference on computer vision, pages 1026-1034

He et al (2016) Deep residual learning for image recognition. In Proceedings of the IEEE conference on computer vision and pattern recognition, pages 770-778

International Osteoporosis Foundation. Vertebral Fracture Teaching Program. https://www.iofbonehealth.org/what-we-do/training-and-education/educational-slide-kits/vertebral-fracture-teaching-program, 2017.

Ioffe and Szegedy (2015) Batch normalization: Accelerating deep network training by reducing internal covariate shift. In International Conference on Machine Learning, pages 448-456

Johnell et al (2006) An estimate of the worldwide prevalence and disability associated with osteoporotic fractures. Osteoporosis international, 17(12):1726-1733

Kamnitsas et al (2017) Efficient multi-scale 3d CNN with fully connected CRF for accurate brain lesion segmentation. Medical Image Analysis, 36:61-78

Klinder et al (2009) Automated model-based vertebra detection, identification, and segmentation in ct images. Medical image analysis, 13(3):471-482

Litjens et al (2017) A survey on deep learning in medical image analysis. arXiv preprint arXiv: 1702.05747

Mitchell et al (2017) Reporting of vertebral fragility fractures: can radiologists help reduce the number of hip fractures? Archives of Osteoporosis, 12(1):71

Roux et al (2007) Mild prevalent and incident vertebral fractures are risk factors for new fractures. Osteoporosis International, 18(12):1617-1624

Schwartz et al (2005) Detection of vertebral fractures. Current osteoporosis reports, 3(4): 126-135

Szegedy et al (2015) Going deeper with convolutions. In Proceedings of the IEEE conference on computer vision and pattern recognition, pages 1-9

What is claimed is:

1. A three-dimensional medical image analysis system for predicting a presence of a vertebral fracture in a subject, comprising:
    a 3D image processor for receiving and processing 3D image data of a 3D image of the subject, producing two or more sets of 3D voxels including a first set of 3D voxels and a second set of 3D voxels, each of the first set of 3D voxels and the second set of 3D voxels corresponding to an entirety of the 3D image, 3D voxels of the first set of 3D voxels each being of equal dimensions, 3D voxels of the second set of 3D voxels each being of equal dimensions, the 3D voxels of the first set of 3D voxels being of different dimensions than the 3D voxels of the second set of 3D voxels;
    a voxel classifier for assigning the 3D voxels of the first set of 3D voxels and the 3D voxels of the second set of 3D voxels one or more class probabilities each of the 3D voxels contains a fracture using a computational model; and
    a fracture probability estimator for estimating a probability of the presence of a vertebral fracture in the subject based on the one or more class probabilities of each the 3D voxels of the first set of 3D voxels and each of the 3D voxels of the second set of 3D voxels.

2. The system of claim 1 further comprising a spinal cord detector for detection of a part of the 3D image comprising the spinal cord.

3. The system of claim 2, wherein the spinal cord detector uses maximum signal intensities to locate the spinal cord in said the 3D image data.

4. The system of claim 3, wherein the spinal cord detector uses anatomical prior information to locate the spinal cord along the x, y and z axes.

5. The system of claim 1, wherein at least one of the sets of 3D voxels is a set of isotropic voxels of 1 mm$^3$.

6. The system of claim 1, wherein the first set of 3D voxels is a set of isotropic voxels of 1 mm$^3$, and the second set of 3D voxels is a set of isotropic voxels of 3 mm$^3$.

7. The system of claim 6, wherein the voxel classifier is configured to classify each of the 3D voxels in the context of the surrounding 3D voxels, and classifies each of the 3D voxels in the first set in the context of 30-40 mm$^3$ of the 3D voxels and each of the 3D voxels in the second set in the context of 90-120 mm$^3$ of the 3D voxels.

8. The system of claim 7, the first set of 3D voxels is classified in the context of 35 mm$^3$ of the 3D voxels and the second set of 3D voxels is classified in the context of 105 mm$^3$ of the 3D voxels.

9. The system of claim 1, wherein at least one of the sets of 3D voxels is a set of anisotropic voxels.

10. The system of claim 1, wherein the 3D image processor is configured to output a set of 3D voxels that are normalized to mean and unit standard deviation of the intensity of the set of 3D voxels.

11. The system of claim 1, wherein the voxel classifier classifies each of the 3D voxels in the one or more of the sets of 3D voxels in the context of the surrounding 3D voxels.

12. The system of claim 11, wherein the voxel classifier is utilizing a CNN comprising a set of neural network layers, wherein the sequence of neural network layers comprises:
    for each set of 3D voxels, one or more convolutional layers configured to receive an input derived from the set of 3D voxels in the context of the surrounding 3D voxels to generate two or more convolved outputs;
    one or more fully connected layers configured for aggregating the two or more convolved outputs; and a classification layer configured for receiving an input from the one or more fully connected layers to perform a final classification.

13. The system of claim 12, wherein the final classification is assigning a probability to each of the 3D voxels to be classified as normal, fracture or background.

14. The system of claim 1, wherein the voxel classifier is configured to classify each 3D voxel using a pre-trained classifier by assigning one or more class labels to the 3D voxel.

15. The system of claim 1, wherein the voxel classifier is configured to calculate for each 3D voxel a probability to be classified as background, normal, fracture class.

16. The system of claim 1, wherein the fracture probability estimator comprises an image classifier that is configured to classify the 3D image into having or not having a fracture and receives an input from the voxel classifier for each 3D voxel of the 3D image and provides an output of an aggregated probability value for the 3D image.

17. The system of claim 16, wherein the image classifier is configured to classify the 3D image based on a minimum threshold value of a number of 3D voxels having an assigned probability of a fracture class.

18. The system of claim 1, wherein the fracture probability estimator comprises a vertebra anatomical label assignor to assign anatomical level information to each vertebrae present in the 3D image.

19. The system of claim 1, wherein the voxel classifier is pre-trained using a set of annotated input 3D images divided into 3D voxels, wherein an intensity noise signal is added to each 3D voxel along x, y and z axes.

20. The system of claim 1, wherein the voxel classifier utilizes a CNN pre-trained using a set of annotated input 3D images using a sampling ratio to favor foreground.

21. The system of claim 1, wherein the voxel classifier utilizes a CNN pre-trained using a set of annotated input 3D images using a sampling ratio of background:normal:fracture of 1:3:3.

22. A medical imaging workstation comprising:
an imaging apparatus for generating at least one 3D image of a subject; and
the system as recited in claim 1 for predicting the presence of a vertebral fracture in the subject in at least one generated image.

23. The system of claim 1, wherein the voxel classifier includes at least one first convolutional layer for analyzing the 3D voxels of the first set of 3D voxels and at least one second convolutional layer for analyzing the 3D voxels of the second set of 3D voxels, the voxel classifier further including one or more connected layers configured to aggregate outputs produced from the at least one first convolutional layer for the 3D voxels of the first set of 3D voxels and outputs produced from the at least one second convolutional layer for the 3D voxels of the second set of 3D voxels.

24. A three-dimensional medical image analysis method of predicting the presence of a vertebral fracture in an individual, the method comprising the steps of:
receiving a 3D imaging data of a 3D image comprising 3D imaging information of the spinal cord;
processing the 3D image and producing two or more sets of 3D voxels including a first set of 3D voxels and a second set of 3D voxels, wherein each of the first set of 3D voxels and the second set of 3D voxels corresponds to the entirety of the 3D image, and wherein 3D voxels of the first set of 3D voxels each being of equal dimensions, 3D voxels of the second set of 3D voxels each being of equal dimensions, the 3D voxels of the first set of 3D voxels being of different dimensions than the 3D voxels of the second set of 3D voxels;
computing for each 3D voxel of the first set of 3D voxels and the 3D voxels of the second set of 3D voxels a class probability of each 3D voxel to contain a fracture using a computational model;
identifying if any of the 3D voxels of the first set of 3D voxels and the 3D voxels of the second set of 3D voxels are classified as containing a fracture; and
predicting the presence of a vertebral fracture in the individual based on the identification of the 3D voxels of the first set of 3D voxels and the 3D voxels of the second set of 3D voxels classified as containing a fracture.

25. The method of claim 24 further comprising a step of locating within the 3D image the spinal cord and generating spine-cropped output images for each set of 3D voxels including the spinal cord and outputting sets of 3D voxels including the spinal cord.

26. The method of claim 25, wherein the step of locating within the image the spinal cord uses anatomical prior information to coarsely locate the spinal cord along the x, y and z axes.

27. The method of claim 24, wherein the classification of 3D voxels as containing a fracture is performed using a model trained using a training data set generated using a method comprising following steps:
i. inputting via a user interface centroid coordinates for each vertebra in a training image;
ii. inputting via the user interface a vertebra fracture label;
iii. fitting a Gaussian centroid likelihood function around selected centroid coordinates;
iv. producing a dataset of pairs of signal intensity and label for each of the training images in the training data set.

28. The method of claim 24, wherein the processing of the 3D image and producing two or more sets of 3D voxels includes adding an intensity noise signal to each produced 3D voxel along x, y and z axis.

29. The method of claim 24, wherein at least one of the sets of 3D voxels is a set of isotropic voxels.

30. The method of claim 24, wherein the step of computing for each 3D voxel the class probability of the 3D voxel to contain fracture using the computational model includes classification each of said the 3D voxels in the one or more sets of 3D voxels in the context of the surrounding 3D voxels.

31. The method of claim 30, wherein the classification of each of the 3D voxels is performed in the context of the surrounding 3D voxels, and classifies each of the 3D voxels in the first set 3D voxels in the context of 30-40 mm$^3$ of the 3D voxels and each of the 3D voxels in the second set of 3D voxels in the context of 90-120 mm$^3$ of said the 3D voxels.

32. The method of claim 24, wherein the step of computing for each 3D voxel class the probability of the 3D voxel to contain a fracture using the computational model produces an output probability to be classified as a background, normal, or fracture class for each 3D voxel in the 3D image.

33. The method of claim 24, wherein the step of predicting the risk of a vertebral fracture includes classification of the 3D image into having or not having a fracture, and wherein the step of predicting the risk of a vertebral fracture includes receiving an input classification value computed by the step of computing for each 3D voxel class probability of the 3D voxel to contain fracture using the computational model for each 3D voxel of the 3D image, and wherein the step of predicting the risk of a vertebral fracture provides an output of an aggregated probability value for the 3D image.

34. The method of claim 24, wherein the step of predicting the risk of a vertebral fracture includes classification of the 3D image based on a minimum threshold value of a number of 3D voxels having an assigned probability of a fracture class.

35. The method of claim 24 further comprising a step of vertebra classification by assigning a probability of the vertebrae having a fracture.

36. The method of claim 24, wherein the step of computing for each 3D voxel the class probability of the 3D voxel to contain a fracture using the computational model utilizes a Convolutional Neural Network (CNN) comprising a set of neural network layers, wherein the set of neural network layers comprises:
   for each set of 3D voxels, one or more convolutional layers configured to receive an input derived from the set of 3D voxels in the context of the surrounding 3D voxels to generate two or more convolved outputs;
   an aggregation layer for aggregating an output from the one or more convolved outputs for each of the sets of 3D voxels;
   one or more convolutional layers receiving an input from the aggregated output from the one or more convolved outputs;
   one or more fully connected layers for aggregating the two or more convolved outputs; and
   a classification layer receiving an input from the one or more fully connected layers to perform a final classification.

37. The method of claim 36, wherein the final classification is performed by assigning a probability to each of the 3D voxels to be classified as normal, a fracture or background.

38. A computer program product, disposed on a non-transitory computer readable media, comprising computer executable code for performing the steps of the method of claim 24 on a computer.

39. A three-dimensional medical image analysis method of predicting the presence of a vertebral fracture in an individual, the method comprising the steps of:
   receiving a 3D imaging data of a 3D image comprising 3D imaging information of the spinal cord;
   processing the 3D image and producing two or more sets of 3D voxels, wherein each of the sets of 3D voxels corresponds to the entire the 3D image, and wherein each of the sets of 3D voxels consists of equal 3D voxels of different dimensions;
   computing for each 3D voxel a class probability of each 3D voxel to contain a fracture using a computational model;
   identifying if any of the 3D voxels are classified as containing a fracture; and
   predicting the presence of a vertebral fracture in the individual based on the identification of the 3D voxels classified as containing a fracture, wherein the classification of 3D voxels as containing a fracture is performed using a model trained using a training data set generated using a method comprising following steps:
   i. inputting via a user interface centroid coordinates for each vertebra in a training image;
   ii. inputting via the user interface a vertebra fracture label;
   iii. fitting a Gaussian centroid likelihood function around selected centroid coordinates;
   iv. producing a dataset of pairs of signal intensity and label for each of the training images in the training data set.

* * * * *